(12) United States Patent
Ambrose

(10) Patent No.: US 7,461,134 B2
(45) Date of Patent: Dec. 2, 2008

(54) BI-DIRECTIONAL COMMUNICATION BETWEEN A WEB CLIENT AND A WEB SERVER

(75) Inventor: Dennis W. Ambrose, Palmyra, NY (US)

(73) Assignee: W.A. Krapf, Inc., Macedon, NY (US)

( * ) Notice: Subject to any disclaimer, the term of this patent is extended or adjusted under 35 U.S.C. 154(b) by 736 days.

(21) Appl. No.: 10/992,991

(22) Filed: Nov. 19, 2004

(65) Prior Publication Data

US 2006/0136564 A1    Jun. 22, 2006

(51) Int. Cl.
G06F 15/13 (2006.01)
(52) U.S. Cl. ............ 709/217; 709/223; 709/227; 715/811; 719/227
(58) Field of Classification Search ............ 709/217, 709/223, 227; 715/811; 719/317
See application file for complete search history.

(56) References Cited

U.S. PATENT DOCUMENTS

| | | | |
|---|---|---|---|
| 6,309,117 B1 | 10/2001 | Bunce et al. | |
| 6,477,575 B1 | 11/2002 | Koeppel et al. | |
| 6,516,338 B1 | 2/2003 | Landsman et al. | |
| 6,584,450 B1 | 6/2003 | Hastings et al. | |
| 6,639,610 B1 | 10/2003 | Sponheim et al. | |
| 6,687,737 B2 | 2/2004 | Landsman et al. | |
| 6,961,759 B2* | 11/2005 | Brown et al. | 709/217 |
| 6,964,023 B2* | 11/2005 | Maes et al. | 715/811 |
| 7,069,560 B1* | 6/2006 | Cheyer et al. | 719/317 |
| 7,296,076 B1* | 11/2007 | Portolani | 709/227 |
| 2003/0115060 A1* | 6/2003 | Junqua et al. | 704/235 |
| 2005/0010892 A1* | 1/2005 | McNair et al. | 717/101 |
| 2006/0031442 A1* | 2/2006 | Ashley et al. | 709/223 |

\* cited by examiner

*Primary Examiner*—Jinsong Hu
(74) *Attorney, Agent, or Firm*—Hiscock & Barclay, LLP; R. Stephen Rosenholm

(57) ABSTRACT

A method and an apparatus for providing bidirectional communication between a user agent and an Internet Web server. Some applications include user agent initiated on demand access to Web content without requiring a Web page reload, updating of shopping cart information, extension of displayed product information and tracking of user interaction history. Web content can be accessed in response to a user agent detectable event, including such as the selection of a text field or a button. This approach enables user agent resident JAVA script to access and process Web content before it is rendered to a user.

15 Claims, 5 Drawing Sheets

```
<html>            ┌1104        ┌1102      ┌1106   ┌1108  1110┐  1112┐
     <a onclick="new Server Content('cookie_id','event_id','procedure_id,'|',
'process_cookie_func')">Event 1</a>
              └1114         └1116
<html>
```

FIG.4B

```
          ┌1102
ServerContent(cookie_id,event_id,procedure_id,delimeter,process_cookie_func)
    {    ┌1122       ┌1120
1124┐ this.image=new Image();       ┌1126
     └this.image.onload=process_cookie_func;
      this.image.src=this.GetRequestURI();
                                  └1128
    }
```

FIG.4C

```
<%
    cookie_id=request.querystring("cookie_id") ─1140
    event_id=request.querystring("event_id") ─1142 select case event_id ─1144
         case "Event 1" ─1146
              web_content="SERVER CONTENT 1" ─1148
         case "Event 2" ─1150
              web_content="SERVER CONTENT 2" ─1152
         case "Event 3" ─1154
              web_content="SERVER CONTENT 3" ─1156
    end select   1168┐   1162┐              1164┐
    response.cookies(cookie_id)=event_id & "|" & web_content ─1160
    response.ContentType="image/gif" ─1170
                    └1172
%>
```

FIG.4D

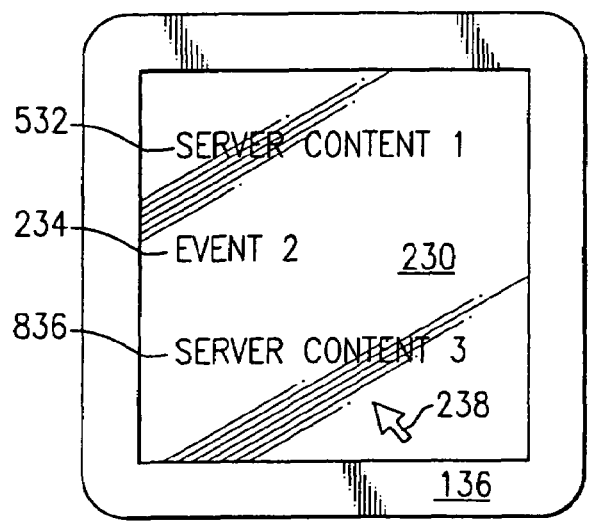
FIG.8
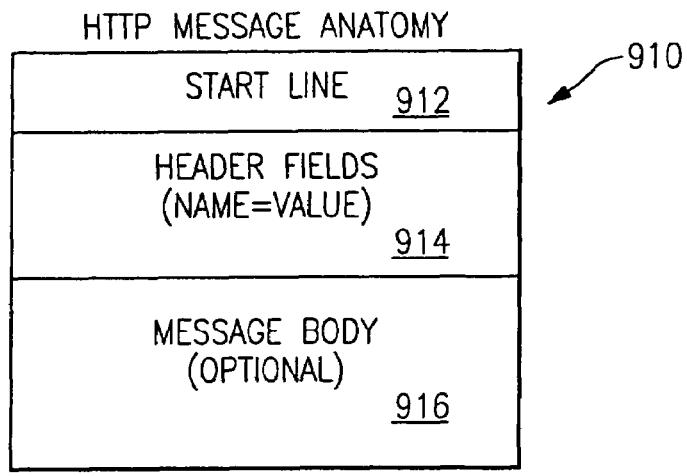
FIG.9
HTTP REQUEST MESSAGE
URI HEADER FIELD
1022 → "PROCEDURE_ID= weather.asp"
1024 → "EVENT_ID= extendedforcast"
1026 → "TIME_ID=15:10 PM February 10,2004"
1028 → "COOKIE_ID= weathercookie"
FIG.10

BI-DIRECTIONAL COMMUNICATION BETWEEN A WEB CLIENT AND A WEB SERVER

FIELD OF THE INVENTION

This invention relates generally to a method and apparatus for bi-directional communication between a user agent and an Internet Web server, and specifically to a method and apparatus for user agent initiated bi-directional communication yielding on-demand access to Web content.

COMPUTER PROGRAM LISTING APPENDIX

Enclosed with the specification are two (2) compact discs (Copy 1 and Copy 2) which are identical. The files recorded on each of the attached compact discs (Copy 1 and Copy 2) represent a computer program listing appendix and are incorporated herein by reference. These files are compatible with the Microsoft Internet Information Services (IIS) server with Active Server Pages (ASP) support. The IIS server executes on the Microsoft operating systems including Microsoft NT Server, Microsoft 2000 Server and Microsoft Server 2003. Listed below are the files recorded on each compact disc including their names, size in bytes and date of creation.

they upgrade to newer versions of software. Some users continue to use older versions of software long after upgrades are available.

As a result, while in operation, a user agent program typically interfaces with a variety of different brands and versions of Web server programs and a Web server program typically interfaces with a variety of different brands and versions of user agent programs. Programmed functionality that functions correctly between a particular Web server and a particular user agent, may not function correctly between the particular Web server and another user agent or between another Web server and the particular user agent or between another Web server and another user agent.

The subset of functionality that can be expected to interoperate correctly between a variety of Web servers and user agents is limited to a not so clearly defined common denominator of interoperating Web server and user agent functionality, exercised between a limited set of user agents and Web servers from various sources. Furthermore, the boundaries of this common denominator are uncertain and frequently subject to change. The reliability and portability of interoperating Web server and/or user agent functionality residing outside of this common denominator is less certain.

| | File Name: | | Type: | |
|---|---|---|---|---|
| 1) | File Name: | cls_server_content.js | Type: | JScript Script File |
| | Size: | 6 KB; | Date of Creation: | Oct. 27, 2004. |
| 2) | File Name: | default.html | Type: | HTML Document; |
| | Size: | 3 KB; | Date of Creation: | Oct. 27, 2004. |
| 3) | File Name: | demo.css | Type: | Cascading Style Sheet Document |
| | Size: | 1 KB; | Date of Creation: | Oct. 27, 2004. |
| 4) | File Name: | load_demo_content.asp | Type: | ASP File; |
| | Size: | 1 KB; | Date of Creation: | Oct. 27, 2004. |
| 5) | File Name: | nojava.html | Type: | HTML Document; |
| | Size: | 1 KB; | Date of Creation: | Oct. 27, 2004. |
| 6) | File Name: | preload.gif | Type: | GIF Image; |
| | Size: | 1 KB; | Date of Creation: | Feb. 6, 2004. |
| 7) | File Name: | READ_ME.txt | Type: | Text Document; |
| | Size: | 2 KB; | Date of Creation: | Oct. 27, 2004. |
| 8) | File Name: | style.js | Type: | JScript Script File; |
| | Size: | 3 KB; | Date of Creation: | Aug. 31, 2004. |

BACKGROUND OF THE INVENTION

The Internet is a decentralized global network connecting large numbers of client and server computers. The world wide web (WWW) is a system of Internet connected server computers, referred to as Web servers, that support the storage and transmission of hypertext markup language (HTML) encoded documents, referred to as Web pages. An Internet connected computer, if executing user agent and related software, can function as a Web client, or if executing Web server and related software, can function as a Web server. A user agent is also referred to as a Web browser. The related software performs operating system and communication protocol functionality required to operate as a Web client or server.

Historically, the design and implementation of a user agent, a Web server and related software has undergone rapid change and evolution. Various designs, implementations and versions of user agent, Web server and related software have been developed and provided from a variety of sources over time. Users of Web server, user agent and related software vary with respect to which combination of brands and versions of software they choose to employ and how frequently To complicate matters, the popularity of the Web is placing upward pressure upon the size and complexity of Web accessible applications and their associated Web pages. New ways of implementing Web server and user agent functionality are needed to accommodate more complex Web applications and larger Web pages in an efficient, reliable and portable manner across a variety of user agent and Web server configurations.

SUMMARY OF THE INVENTION

The invention provides a method and apparatus of bi-directional communication between a user agent (Internet Web client) and an application server (Internet Web server). In one aspect, the invention provides for user agent initiated on demand access to Web content. The invention further enables the display of the on demand accessed Web content as a portion of a previously displayed Web page, without requiring the re-display (re-rendering) of an entire previously rendered Web page.

In another aspect, applications of the invention include but are not limited to, updating the content of a shopping cart, extending displayed product information upon the selection of an item and rotating advertisements displayed by a user agent. In another aspect, applications include tracking user interaction history and interactive messaging between a user agent and a web server.

In yet another aspect, the invention provides a relatively portable means for accessing Web content by circumventing the need to rely upon the HTTP body field of an HTTP message to carry the accessed Web content.

BRIEF DESCRIPTION OF THE DRAWINGS

For a further understanding of these and objects of the invention, reference will be made to the following detailed description of the invention which is to be read in connection with the accompanying drawings, wherein:

FIG. 4B illustrates an embodiment of a simplified sample of HTML script that associates a user agent detectable event with a java script action.

FIG. 4C illustrates an embodiment of a simplified sample of java script that performs actions in association with the user agent detectable event defined within the HTML script of FIG. 4B.

FIG. 4D illustrates an embodiment of a simplified sample of ASP server script that performs actions in response to receiving the HTTP request message transmitted from the user agent.

FIG. 8 illustrates the result of the user agent receiving and processing the Web content information in response to the user agent detectable event of FIG. 7.

FIG. 9 illustrates a simplified anatomy of an HTTP message that includes a start line, one or more header fields and an optional message body.

FIG. 10 illustrates components of a concatenated Uniform Resource Identifier (URI) string that includes a server procedure identifier, and that optionally includes an event identifier, a date/time identifier and an HTTP object identifier residing within a header field of an HTTP request message.

DETAILED DESCRIPTION OF THE INVENTION

Figure 1:
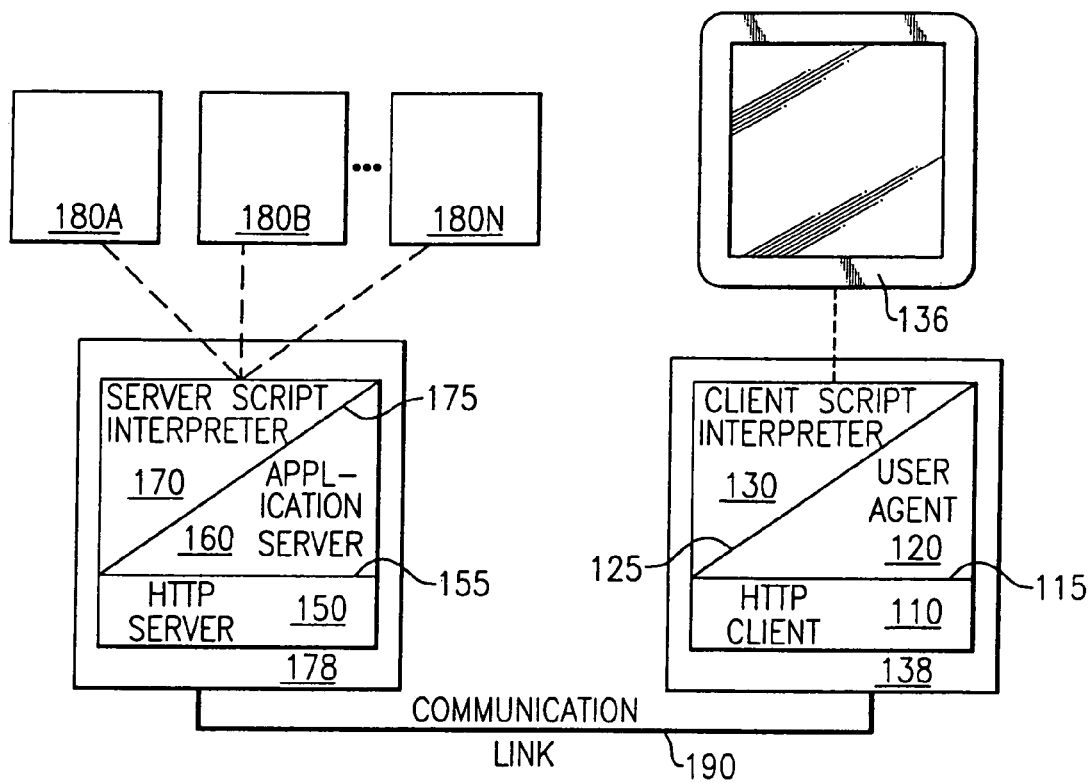
FIG. 1 illustrates an arrangement of Internet components including a user agent and display monitor, an HTTP client and HTTP server, a communications link and an application server with access to various portions of Web content.

In accordance with the invention, FIG. 1 illustrates an arrangement of Internet components including a user agent 120, a client script interpreter 130, a display monitor 136, a HTTP (Hyper Text Transfer Protocol) client 110 and HTTP server 150, a communications link 190, an application server 160 and server script interpreter 170 with access to various portions of web content 180A-180N. The user agent 120 and HTTP client 110 are embodied as separate software modules that reside within a personal computer 138. The application server 160 and HTTP server 150 are also embodied as separate software modules that reside within a network accessible computer.

The user agent 120 is a software module that interacts with a user via a display monitor 136 and via other input devices including a keyboard and a pointing device, such as a mouse (not shown). The HTTP client 110 is a software module that sends and receives HTTP message transactions (messages) to and from at least one other HTTP server 150.

The user agent software 120 interoperates with the HTTP client 110 via a programming interface 115. The programming interface 115 represents a software boundary between the HTTP client software 110 and other software external to the HTTP client 110.

The programming interface 115 enables the transfer of information between the user agent 120 and the HTTP client 110 and enables the user agent 120 to request the transmission of information by the HTTP client 110 to the application server 160 via the HTTP server 150. The programming interface 115 also enables the user agent 120 to receive information transmitted from the application server 160 through the HTTP server 150 and through the HTTP client 110.

In a typical use scenario, during its initialization, the user agent 120 loads and displays web content to a user, in the form of an initial web page. In response to the entry of a web address by the user, the user agent 120 requests, receives and loads other web content from a web server, in the form of another web page, in accordance with the web address entered by the user.

To load a web page, the user agent 120 invokes a request for the web page via its programming interface 115 with the HTTP client 110. The web page is identified by a Uniform Resource Identifier (URI)) which is constructed by the user agent 120 and passed along with the request to the HTTP client 110. A uniform resource locator (URL) is a type of URI.

The HTTP client 110 processes the request from the user agent 120 by transmitting an HTTP request message to an HTTP server 150 that is associated with the URI. The HTTP server 150 receives the HTTP request message and transfers the URI to the application server 160 via its programming interface 155 with the application server 160.

The application server 160 receives the URI, accesses and transfers the URI addressed Web content to the HTTP server 150 via the programming interface 155. The HTTP server transmits an HTTP response message including the addressed Web content through the Internet to the HTTP client 110. The HTTP response message carries the Web content, such as a Web page including HTML, within its body field. The HTTP client 110 receives the HTTP response message from the Internet and transfers the Web content to the user agent 120. The user agent 120 processes the Web content via a web page reload (display).

Information is communicated between the user agent 120 and the application server 160 over the communications link 190 via the transmission of HTTP protocol request and response message transactions (messages). In a typical scenario, an HTTP request message, transmitted from an HTTP client 110, identifies and requests the transmission of Web content from the HTTP server 150. An HTTP response message, transmitted from an HTTP server 150, carries the Web content to the source of the HTTP request message, namely the HTTP client 110.

Web content is typically represented in the form of Hypertext Markup Language (HTML) that is packaged into one or more Web pages and stored within one or more files residing on a network accessible computer. The HTML may encapsulate or reference other types of script languages, including JAVA script.

The Web content received by the user agent 120 is processed as a Web page. In contrast to the methods of the invention, a user agent 120 typically displays a newly received web page by rendering (drawing over) and replacing all information previously displayed onto the display monitor 136. This action is also referred to as a web page reload.

Typically, the client script interpreter 130 is a JAVA script interpreter 130 that processes JAVA script associated (encapsulated) with web content received by the user agent 120. The JAVA script interpreter 130 interoperates with the user agent 120 via a programming interface 125. The programming interface 125 provides the JAVA script interpreter 130 with limited access to the internal functionality of the user agent 120.

Also, the server script interpreter 170 is typically an ASP (Active Server Page) script interpreter 130 that processes ASP script identified by a URI received from a user agent 120. The ASP script interpreter 170 interoperates with the application server 160 via a programming interface 175. The programming interface 175 provides the ASP script interpreter 130 with limited access to the internal functionality of the application server 160.

In accordance with the invention, an alternative method of bi-directional communication between a user agent and a web server is disclosed. In one aspect, the alternative method enables on-demand delivery of web content to the user agent without necessitating a web page reload by the user agent. In another aspect, the alternative method employs the HTTP protocol and employs a cookie, embodied as an HTTP message header field, to transfer web content. An in another aspect, the alternate method functions for a combination of a variety of designs and versions of Web server and user agent software 120.

In yet another aspect, this alternative method circumvents the use of a body field that resides within an HTTP response message to transfer web content. Typically, user agent software that receives and processes a body field including Web content will display the body field as a reload of an entire Web page. This type of user agent 120 behavior can be a disadvantage to the user.

The increasing size and complexity of Web pages is causing increasing performance penalties for page re-loading and display. Unfortunately, functionality for accessing Web content within the common denominator of popular Web server and user agent configurations typically relies on the use of an HTTP body field within an HTTP message for carrying the Web content. The use of an HTTP body field within an HTTP message typically causes a Web page reload to be performed by a user agent 120.

Popular user agents 120 within this common denominator, including such as Microsoft's Internet Explorer 6.0 or Netscape 7.1, typically do not provide a way for JAVA script loaded within a resident Web page, to access and display other Web content carried within the body field of an HTTP message, without causing the reload and re-display (re-render) of an entire Web page.

In one embodiment of the invention, a user agent 120 constructs and transmits a first communication including an HTTP request message to a (Web) application server 160, preferably in response to a user agent detectable event. The HTTP request message includes a uniform resource identifier (URI). The URI preferably includes a procedure identifier. A procedure identifier uniquely identifies a server procedure 170 and communicates to the application server the identity of the server procedure 170 for which to execute and process the content of the HTTP request message transmitted from the user agent 120.

The server procedure 170 receives instructions transmitted from the user agent 120 via the content of the HTTP request message. Preferably, instructions are stored within the URI. The server procedure transmits a second communication including an HTTP response message in response to the instructions received from the HTTP request message included within the first communication. Preferably, the HTTP response message includes a cookie that stores any information to be delivered to the user agent 120. A cookie is a type of header field stored within the HTTP response message. All header fields, including cookies, are stored outside of an HTTP body field of an HTTP message.

In the preferred embodiment, URI information that is transmitted between a user agent 120 and a Web server 178 includes text strings packaged as "name=value" structures as shown in FIG. 10. A "name" can function as a parameter name, such as a name which identifies a data object, such as Web content or the name of a cookie to carry Web content. Optionally, other related information, such as a user agent event, a server procedure or time parameters can accompany the data object (web content) identifying parameter.

Figure 2:
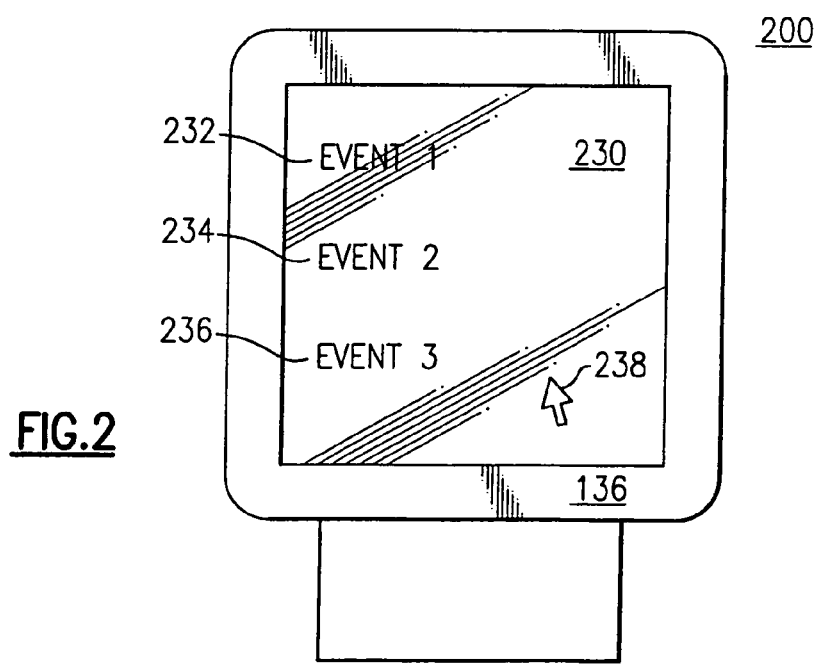
FIG. 2 illustrates a Web page including three text fields that is displayed onto a display monitor via a user agent.

FIG. 2 illustrates a first web page 230 that includes HTML represented text fields labeled "Event 1" 232, "Event 2" 234, and "Event 3" 236. The first web page 230 is displayed onto a display monitor 136 via the user agent 120. A mouse pointer 238 is also displayed onto the display monitor 136. The web page 230 was previously transmitted from the application server 160, through the HTTP server 150 and the HTTP client 110, to the user agent 120.

The web page 230 includes hidden information, such as JAVA script, that is not displayed onto the display monitor 136 and stored within the user agent 120. The JAVA script loaded into the first web page 230 includes a mapping of procedure identifiers to events associated with displayed portions of the web page 230. Each procedure identifier represents a server procedure configured to interoperate and execute in association with the application server 160. The server procedure can be configured to transmit web content information to the user agent 120.

HTML encodes images including graphics and text that are rendered (drawn) onto the display monitor 136 in the form of a matrix of pixels. HTML also includes and tags script, such as JAVA script, which is not displayed onto the display monitor 136. The execution of a script is conditioned upon its context within HTML. A script can be executed upon the occurrence of an event associated with the rendered HTML field, such as a text field.

The HTML loaded within the first web page 230 of FIG. 2 includes instructions to direct the JAVA script interpreter 130 and/or the user agent 120 to render the text fields 232, 234, 236 onto the display monitor 136 and to execute a procedure within the loaded JAVA script upon the selection of any text field.

Figure 3:
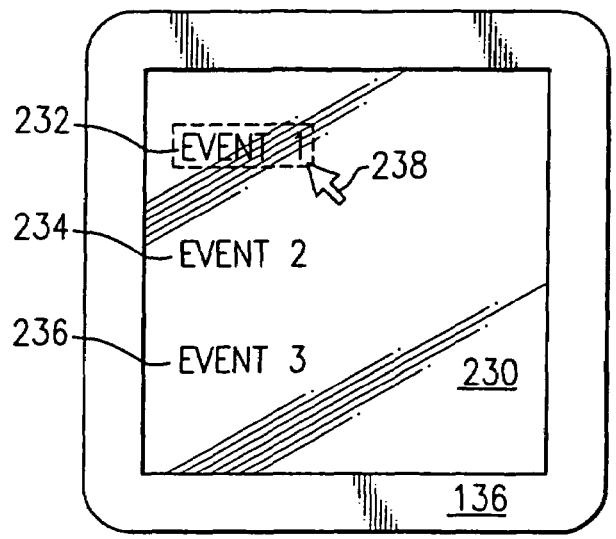
FIG. 3 illustrates a user agent detectable event where the text field labeled "Event 1" is being selected via a mouse pointer.

FIG. 3 illustrates an occurrence of a user agent detectable event where the user agent 120 detects the selection of the text field 232, labeled "Event 1", by a user using a mouse pointing device with an associated displayed pointer 238. The text field 232 is highlighted as indicated by a dashed perimeter border.

Upon detecting the selection event, the user agent 120 invokes the JAVA script interpreter 130 to execute JAVA script loaded with the first web page 230. The JAVA script anticipates and executes actions in response to various events associated with the first web page 230.

Figure 4:
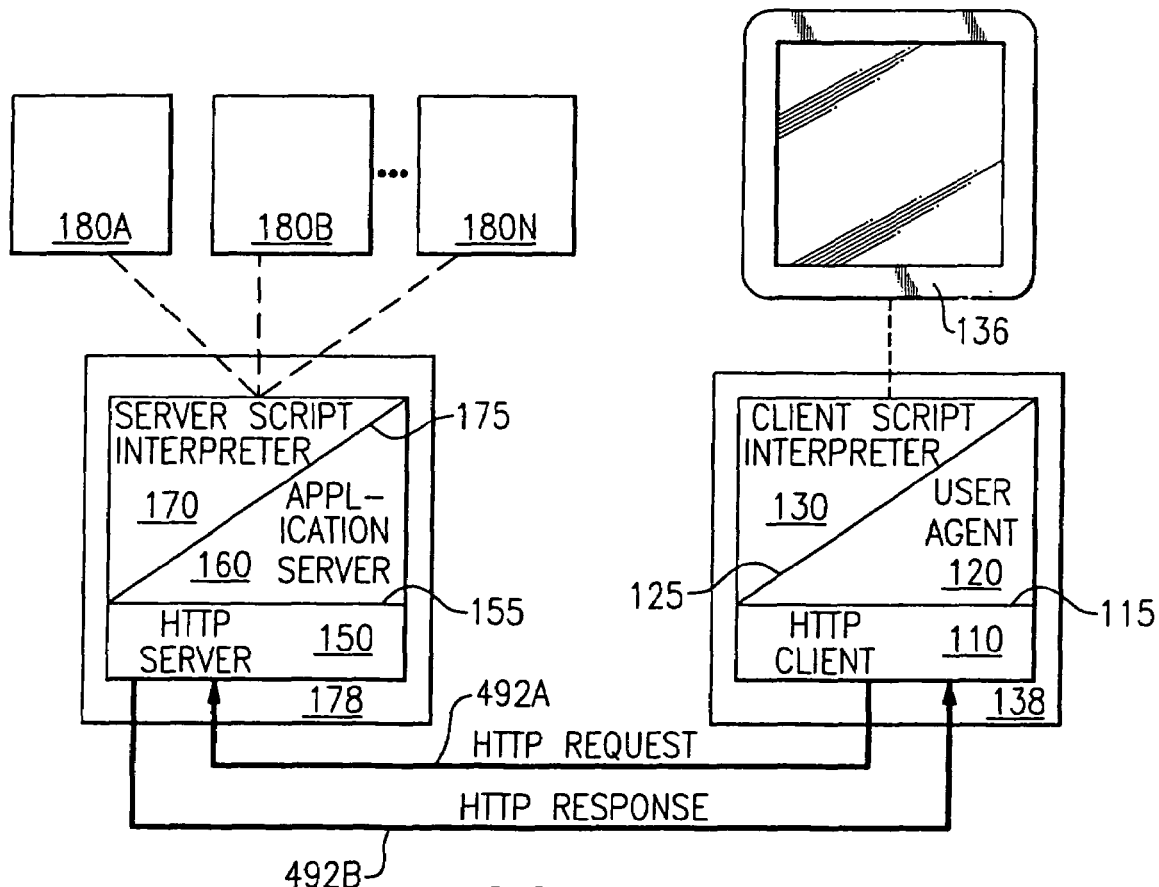
FIG. 4 illustrates the communication of an HTTP request message from the HTTP client and a following communication of an HTTP response message from the HTTP server, upon occurrence of the user agent detectable event illustrated in FIG. 3.

FIG. 4 illustrates the transmission of a HTTP request message 492A to the application server 160 resulting from the occurrence of the user agent detectable event illustrated in FIG. 3 and illustrates the transmission of a following HTTP response message 492B from the application server 160.

Upon detecting the selection event of text field 232, the user agent 120 executes the JAVA script loaded with the first web page 230 via invocation of the JAVA script interpreter 130. In accordance with instruction from the loaded JAVA script, the JAVA script interpreter 130 associates a procedure identifier with the event that is associated with the selection of text field 232, incorporates the procedure identifier into a URI and invokes a request for web content information addressed by the URI via the programming interface 125. The JAVA script interpreter then waits to receive a data object, specifically a cookie, including the web content information addressed by the URI.

To invoke the request, the HTTP Client 110 transmits an HTTP request message 492A including the URI. The HTTP request message 492A is received by the HTTP server 150. The HTTP server 150 interoperates with the application server 160 via the programming interface 155. The HTTP server 150 processes the received HTTP request message 492A and transfers the URI to the application server 160.

The application server 160 processes the URI and accesses web content information 180*a*-180*n* addressed by the URI. The application server 160 then interoperates with the HTTP server 150 to construct a HTTP response message 492B that includes the web content information addressed by the URI.

FIG. 4B illustrates an embodiment of a simplified sample of HTML script that associates a user agent detectable event with a java script action. The ServerContent function 1102 is a java script constructor method for an object named ServerContent. The ServerContent method 1102 is executed upon an event (onclick) 1104 defined by the selection of the text field having a label string equal to "Event 1" 1114, via a pointing device. The text field having a label string equal to "Event 1" 11114 resides and is displayed as part of a Web page including the illustrated HTML script. Execution of the ServerContent method 1102 causes the java script interpreter to perform actions including the transmission of an HTTP request message 492A within a first communication from the user agent 120 to the application server 160.

Upon execution, the ServerContent function is passed 5 parameters. The cookie_id parameter 1106 identifies a cookie to be transmitted within a second communication 492B from the application server 160 to the user agent 120. The event_id parameter 1108 identifies an event associated with the first communication from the user agent 120 to the application server 160. The procedure_id 1110 parameter identifies the server procedure to execute and process the content of the first communication 492A. The parameter 1112 is a delimiter used to separate information within the URI. The process_cookie_func parameter 1114 is the java script function that processes the cookie residing within the second communication 492B.

FIG. 4C illustrates an embodiment of a simplified sample of java script that performs actions in association with the user agent detectable event defined within the HTML script of FIG. 4B. During the execution of the ServerContent method, a HTTP request message 492A is constructed and transmitted. Preferably, an empty image is constructed and used as a vehicle to construct the HTTP request message 492A that is transmitted to the application server 160.

The ServerContent method 1102 constructs an empty image object 1120 and assigns a pointer to the image object 1120 to a data member of the ServerContent object named this.image 1122. When a cookie is later received by the user agent, an "onload" event handler this.image.onload 1124 is executed. The ServerContent method 1102 assigns the function named process_cookie_func 1126 to the "onload" event handler (this.image.onload) 1124. Consequently, when a cookie is later received by the user agent 120, the process_cookie_func( ) function 1126 is executed.

The ServerContent method 1102 calls the function GetRequestURI( ) 1128 to return a pointer to a URI text string. The returned pointer to the URI text string is assigned to the data member of the Image object named this.image.src 1130. This assignment causes the user agent to transmit an HTTP request message 492A including an image content type header field for the empty image and including a URI header field, to the application server 160.

FIG. 4D illustrates an embodiment of a simplified sample of active server page (ASP) server script that performs actions in response to receiving the HTTP request message 492A transmitted from the user agent 120. Upon receiving the HTTP request message 492A, the application server 160 executes the server procedure identified by the procedure identifier 1110 residing within the URI field of the HTTP request message 492A. The server procedure is executed via the server script interpreter 170. During the execution of the server procedure 170, the HTTP request message 492A is parsed and an HTTP response message 492B is transmitted to the user agent 120.

Summarizing the application server script of FIG. 4D, line 1140, the server script extracts the cookie identifier from the URI field residing within the HTTP request message 492A. Line 1142, extracts the event identifier from the URI field residing within the HTTP request message 492A. Line 1144, is a switch statement whose operation depends upon the value of the event_id 1108. If the event_id 1108 equals the text string "Event 1" 1146, then the web_content variable is assigned to the address of a text string "SERVER CONTENT 1" 1148. If the event_id equals "Event 2" 1150, then the web_content variable is assigned to the address of a text string "SERVER CONTENT 2" 1152. If the event_id equals "Event 3" 1154, then the web_content variable is assigned to an address of a text string "SERVER CONTENT 3" 1156.

Script line 1160, transfers the event identifier (event_id) 1162 and the web content 1164 separated by a delimiter (|) 1166 into a cookie field of the HTTP response message 492B identified by the cookie identifier (cookie_id) 1168. Line 1170, sets the content type field of the HTTP response message to "image/gif" 1172 which also causes the HTTP response message 492B to be transmitted to the user agent 120.

The user agent 120, upon receiving the transmitted cookie via the HTTP client 110, generates an image onload event, which causes the execution of the image onload handler 1124 and the process_cookie_func( ) function 1126. The process cookie_func( ) function 1126 extracts the transmitted web_content 1148, 1150, 1152 as a text string and displays the web_content onto a portion of the presently displayed web page.

Figure 5:
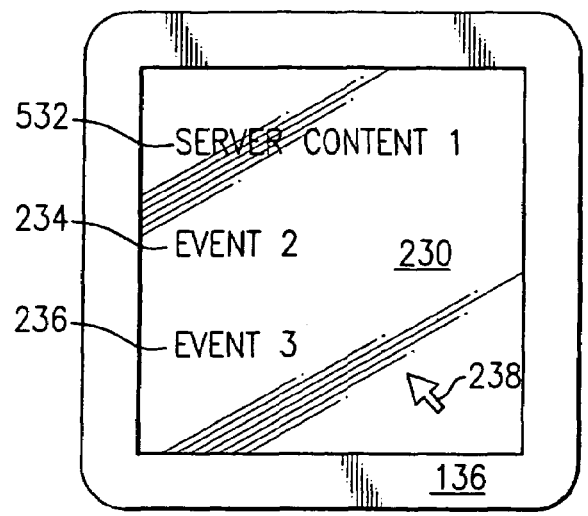
FIG. 5 illustrates the result of the user agent receiving and processing the Web content information included within the HTTP response message illustrated in FIG. 4.

FIG. 5 illustrates the displayed results of receiving and processing the web content information included within the HTTP response message 492B transmitted from the application server 160, as illustrated in FIG. 4. Note that the text fields labeled "Event 2" 234 and "Event 3" 236 are unmodified.

As previously stated, the loaded JAVA script instructs the JAVA script interpreter 130 to wait for the receipt of a response from application server 160. In this embodiment, the response is an HTTP response message 492B. The HTTP response message 492B includes a data object that includes the web content information addressed by the URI field residing within the prior transmitted HTTP request message 492A. The data object is a cookie residing inside of a header field within the HTTP response message 492B.

The HTTP client 110 software receives and processes the HTTP response message 492B and extracts a cookie residing within a header field of the HTTP response message 492B. The HTTP client software 110 then transfers the cookie to the user agent 120 via the programming interface 115.

The user agent 120 stores the cookie as a data member of a document object which is defined and instantiated within the user agent 120. The document object is sub-classed from the window object which is also defined and instantiated within the user agent 120. The cookie value, embodied as a character string, includes the requested first web content information.

The JAVA script instructs the JAVA script interpreter 130 to check for and verify the presence of the cookie stored in association with the document object and renders the requested web content information (value of the cookie) over a portion of the displayed web page 230, specifically over the top most text field 232. Pixels included within the text field 232 are rendered (redrawn) to display the requested web content information. The requested web content information represents a new text field labeled "Server Content 1" 532, expressed in HTML format.

Figure 6:
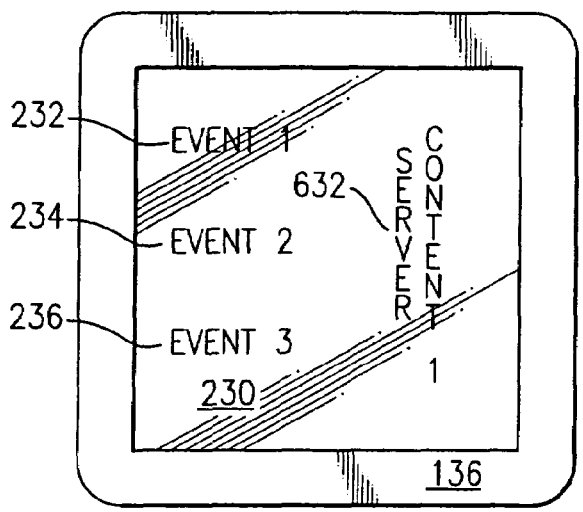
FIG. 6 illustrates an alternative method of processing the Web content information included within the HTTP response message as illustrated in FIG. 4.

FIG. 6 illustrates an alternative way to process the newly received web content information included within the HTTP response message 492A transmitted from the application server 160, as illustrated in FIG. 4. Instead of drawing the text field 532 from left to right over the text field 232, the JAVA script loaded within the first web page 230, instructs the JAVA script interpreter 130 to draw the requested web content information from top to bottom over a portion of the first web page 230 that is separate from any previously rendered text field 232, 234 and 236. In this scenario, all of the three text fields 232, 234, and 236 remain unmodified after rendering (drawing) the newly received web content information.

Figure 7:
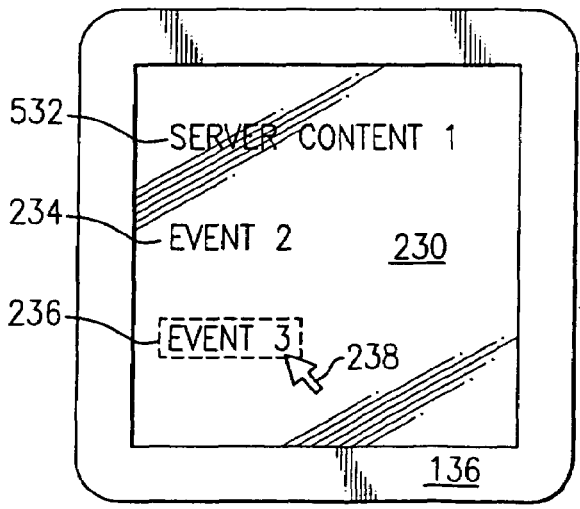
FIG. 7 illustrates a user agent detectable event where the text field labeled "Event 3" is being selected via a mouse pointer.

FIG. 7 illustrates a user agent detectable second event where the text field labeled "Event 3" 236 is selected via a mouse pointer 238. The text field 236 is shown as being highlighted via a dashed line perimeter.

Upon detecting the text field selection second event, the user agent 120 executes the JAVA script loaded with the original displayed web page 230. The JAVA script associates a second procedure identifier with the second event that is associated with the text field 236 and incorporates the second procedure identifier into a second URI, invokes a second request for web content information including the second URI via the programming interfaces 125.

The JAVA script then waits to receive a second response from application server 160. The second response being an HTTP response message including a second data object including second web content information transmitted to the user agent 120 from the application server 160, in response to the second request message. The data object is a cookie residing inside of a header field within the second HTTP response message.

The invocation of the second request for web content initiates transmission of an HTTP request message by the HTTP client 110 and a following transmission of an HTTP response message by the HTTP server, as described in association within FIG. 4. In this scenario, the second web content information is addressed by a second HTTP request message and the second web content information is transmitted as a data object residing inside of a second HTTP response message. In this embodiment, the data object is a cookie residing within a header field of the HTTP response message.

FIG. 8 illustrates the displayed results of the user agent 120 processing the second web content information transmitted from the application server 160 in response to the user agent detectable second event illustrated in FIG. 7.

The JAVA script loaded inside the user agent 120 along with the original displayed web page 230, waits for the receipt of a data object, specifically a cookie, residing within an HTTP response message. The HTTP client 110 software receives and processes the HTTP response message, and extracts and stores a cookie residing within the HTTP response message in a manner that is accessible to the JAVA script interpreter.

In this embodiment, the cookie is transferred from the HTTP client 110 to the user agent 120 via the programming interface 125. The user agent 120 stores the cookie as a data member of a document object which is defined and instantiated within the user agent 120. The document object is sub-classed from the window object which is defined and instantiated within the user agent 120. The cookie value, embodied as a character string, includes the second web content information.

The JAVA script software checks for and verifies the presence of the cookie stored in association with the document object and renders the second web content information (value of the cookie) over a portion of the displayed web page 230, specifically over the bottom most text field 236. Pixels included within the text field 236 are rendered (redrawn) to display the requested second web content information.

The requested second web content information represents a new text field labeled "Server Content 3" 836, expressed in HTML format.

FIG. 9 illustrates a simplified structure of an HTTP message that includes a start line, one or more header fields 914, and an optional message body 916. The message body 916 is specified to carry web content for display by a user agent 120. Further information regarding HTTP message structure is located within the HTTP 1.1 specification that is accessible at Internet Web address www.w3c.org and hereby incorporated by reference. Further information regarding the cookie structure is also available at www.w3c.org and at www.netscape.com.

FIG. 10 illustrates the components of a concatenated uniform resource identifier (URI) string that includes a procedure identifier 1022, and that optionally includes an event identifier 1024, a time identifier 1026 and an object identifier 1028 residing within a header field 914 of an HTTP request message 492A.

A sample URI character string 1030 is also illustrated that includes a procedure identifier, an event identifier, a time identifier, and a data object identifier. The procedure identifier is set to the value "weather.asp", the event identifier is set to "extended forecast" and the time identifier is set to "15:10 PM Feb. 10, 2004" and the data object identifier is set to "weather cookie".

Upon receipt of the URI 1030, the application server 160 executes a server script 170 named "weather.asp" and provides the event identifier value equal to "extended forecast", the date/time value equal to "15:10 PM Feb. 10, 2004" and the data object identifier equal to "weather cookie" as parameters to the "weather.asp" script.

The "weather.asp" server script constructs a data object that is embodied as an HTTP cookie named "weather cookie"

and sets the value of the cookie named "weather cookie" to a text string that is transmitted as a portion of an HTTP response message that is received and displayed by the user agent 120 via the client side script interpreter 130.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. A method for providing bidirectional communication between a user agent and a Web application server over a network, comprising the steps of:

provide a user agent and an application server, said user agent and said application server communicating via a hypertext transfer (HTTP) protocol, each of said user agent and said application server executing within a computer;

providing a server procedure configured to operate in association with said application server and associating a procedure identifier with said server procedure, said procedure identifier identifying said server procedure, said server procedure executing within a computer;

constructing by said user agent, a hypertext transfer protocol (HTTP) uniform resource identifier (URI) that includes at least said procedure identifier and a time identifier, said time identifier identifying a time of occurrence of said event and where said uniform resource identifier (URI) is constructed by said user agent in response to a user agent detectable event and where said procedure identifier is selected in association with said event;

transmitting by said user agent to said application server, a first communication including a hypertext transfer protocol (HTTP) REQUEST message, said (HTTP) REQUEST message including said uniform resource identifier (URI);

receiving and processing by said application server, said (HTTP) REQUEST message, said processing including the execution of said server procedure identified by said procedure identifier, constructing by said server procedure, a second communication including information responding to said first communication, said information stored within a portion of an HTTP RESPONSE message and where said portion is located outside of a body field of said HTTP RESPONSE message; and transmitting by said application server to said user agent, said second communication.

2. The method of claim 1 where said information of said second communication is stored within a cookie.

3. The method of claim 1 where said information of said second communication is stored within an HTTP state object.

4. The method of claim 1 where said information of said second communication is stored within an HTTP header field.

5. The method of claim 1 where said information of said second communication is Web content that is accessible to said application server.

6. The method of claim 5 where said user agent controls a display monitor and further including the step of rendering by said user agent at least a portion of said Web content information onto said display monitor.

7. The method of claim 6 where said rendering draws over a portion of a Web page previously rendered onto said display monitor without causing a Web page reload operation.

8. The method of claim 5 further including the step of storing a web content identifier into said (HTTP) uniform resource identifier (URI), said web content identifier identifying said web content.

9. The method of claim 1 further including the step of storing an event identifier into said (HTTP) uniform resource identifier (URI), said event identifier identifying said event.

10. The method of claim 1 where at least one of the steps of constructing and communicating by said user agent are performed by a client script software executing in association with said user agent.

11. The method of claim 1 where the HTTP request message includes an image content-type header field.

12. The method of claim 11 where the user agent detects reception of said HTTP response message via an image on-load event.

13. The method of claim 1 where said server procedure is implemented as a server script software executing in association with said application server.

14. A Web server providing bi-directional communication with a user agent over a network comprising:

an application server including at least one server procedure configured to operate in association with said application server, said application server configured to communicate with a user agent via a hypertext transfer (HTTP) protocol, each of said application server, said server procedure and said user agent executing on a computer;

said application server configured for receiving and processing a first communication including an (HTTP) REQUEST message from said user agent, said processing including the execution of said server procedure identified by a procedure identifier included within said (HTTP) REQUEST message, said (HTTP) REQUEST message including a hypertext transfer protocol (HTTP) uniform resource identifier (URI) that includes at least said procedure identifier and a time identifier, said time identifier identifying a time of occurrence of said event and where said uniform resource identifier (URI) is constructed by said user agent in response to a user agent detectable event and where said procedure identifier is selected in association with said event;

said server procedure configured for constructing a second communication including information responding to said first communication, said information stored within a portion of an HTTP RESPONSE message and where said portion is located outside of a body field of said HTTP RESPONSE message; and wherein said application server is configured to transmit to said user agent, said second communication.

15. A Web client providing bi-directional communication with a Web server comprising:

a user agent configured for communicating with an application server, said application server including a server procedure configured to operate in association with said application server, said server procedure identified by a procedure identifier, said application server being configured to communicate with a user agent via a hypertext transfer (HTTP) protocol, each of said user agent, said application server and said server procedure executing within a computer;

said user agent configured for constructing a hypertext transfer protocol (HTTP) uniform resource identifier (URI) that includes said procedure identifier and a time identifier, said time identifier identifying a time of occurrence of said event and where said uniform resource identifier (URI) is constructed by said user agent in response to a user agent detectable event and where said procedure identifier is selected in association with said event; and said user agent is configured for transmitting to said application server, a first communication including a hypertext transfer protocol (HTTP) REQUEST message, said (HTTP) REQUEST message including a uniform resource identifier (URI) including said procedure identifier, and configured for receiving a second communication including information responding to said first communication, said information stored within a portion of an HTTP RESPONSE message and where said portion is located outside of a body field of said HTTP RESPONSE message; and configured for extracting and processing said information.

* * * * *